United States Patent
Kim et al.

(10) Patent No.: US 10,796,206 B2
(45) Date of Patent: Oct. 6, 2020

(54) METHOD FOR INTEGRATING DRIVING IMAGES ACQUIRED FROM VEHICLES PERFORMING COOPERATIVE DRIVING AND DRIVING IMAGE INTEGRATING DEVICE USING SAME

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 16/739,220

(22) Filed: Jan. 10, 2020

(65) Prior Publication Data
US 2020/0250499 A1 Aug. 6, 2020

Related U.S. Application Data

(60) Provisional application No. 62/799,514, filed on Jan. 31, 2019.

(51) Int. Cl.
*G06K 9/62* (2006.01)
*G06N 3/04* (2006.01)
(Continued)

(52) U.S. Cl.
CPC ......... *G06K 9/6289* (2013.01); *G06K 9/6261* (2013.01); *G06K 9/6262* (2013.01);
(Continued)

(58) Field of Classification Search
CPC .. G06K 9/6289; G06K 9/6261; G06K 9/6262; G06N 3/0454; G06N 3/084
See application file for complete search history.

(56) References Cited

U.S. PATENT DOCUMENTS 6,169,940 B1 * 1/2001 Jitsukata ............... B62D 1/28
340/903
8,995,956 B2 * 3/2015 Lavi ...................... H04W 84/22
343/711
(Continued)

OTHER PUBLICATIONS

Yee, Ryan, et al. "Collaborative perception for automated vehicles leveraging vehicle-to-vehicle communications." 2018 IEEE Intelligent Vehicles Symposium (IV). IEEE, 2018.
(Continued)

*Primary Examiner* — Utpal D Shah
(74) *Attorney, Agent, or Firm* — Husch Blackwell LLP

(57) ABSTRACT

A method for integrating images from vehicles performing a cooperative driving is provided. The method includes steps of: a main driving image integrating device on one main vehicle (a) inputting one main driving image into a main object detector to (1) generate one main feature map by applying convolution operation via a main convolutional layer, (2) generate main ROIs via a main region proposal network, (3) generate main pooled feature maps by applying pooling operation via a main pooling layer, and (4) generate main object detection information on the main objects by
(Continued)

applying fully-connected operation via a main fully connected layer; (b) inputting the main pooled feature maps into a main confidence network to generate main confidences; and (c) acquiring sub-object detection information and sub-confidences from sub-vehicles, and integrating the main object detection information and the sub-object detection information using the main & the sub-confidences to generate object detection result.

10 Claims, 5 Drawing Sheets

(51) Int. Cl.
    *G06N 3/08*     (2006.01)
    *G06K 9/00*     (2006.01)
(52) U.S. Cl.
    CPC ........... *G06N 3/0454* (2013.01); *G06N 3/084* (2013.01); *G06K 9/00791* (2013.01)

(56) References Cited

U.S. PATENT DOCUMENTS

| | | | |
|---|---|---|---|
| 9,672,734 B1* | 6/2017 | Ratnasingam | H04L 67/12 |
| 9,946,960 B1 | 4/2018 | Kim et al. | |
| 10,503,988 B2* | 12/2019 | Cordell | G06K 9/66 |
| 2010/0250106 A1* | 9/2010 | Bai | G08G 1/096716<br>701/117 |
| 2015/0154457 A1* | 6/2015 | Datta | G06K 9/6256<br>382/104 |
| 2017/0083792 A1* | 3/2017 | Rodriguez-Serrano | G06F 16/54 |
| 2018/0170375 A1* | 6/2018 | Jang | B60K 28/06 |
| 2019/0049957 A1* | 2/2019 | Healey | G01C 21/3484 |
| 2019/0065868 A1* | 2/2019 | Tran | G06K 9/00785 |
| 2019/0113917 A1* | 4/2019 | Buch | G06N 3/0454 |
| 2019/0114489 A1* | 4/2019 | Jackson | G10L 25/51 |
| 2019/0130762 A1* | 5/2019 | Yang | G01S 11/10 |
| 2019/0152492 A1* | 5/2019 | el Kaliouby | B60W 30/10 |
| 2019/0180115 A1* | 6/2019 | Zou | G06N 3/084 |
| 2019/0228236 A1* | 7/2019 | Schlicht | G06K 9/46 |
| 2019/0333232 A1* | 10/2019 | Vallespi-Gonzalez | G06N 5/003 |
| 2019/0361118 A1* | 11/2019 | Murad | G01S 17/48 |
| 2019/0384303 A1* | 12/2019 | Muller | G05D 1/0257 |

OTHER PUBLICATIONS

Liu, Xinchen, et al. "Large-scale vehicle re-identification in urban surveillance videos." 2016 IEEE International Conference on Multimedia and Expo (ICME). IEEE, 2016.

\* cited by examiner

METHOD FOR INTEGRATING DRIVING IMAGES ACQUIRED FROM VEHICLES PERFORMING COOPERATIVE DRIVING AND DRIVING IMAGE INTEGRATING DEVICE USING SAME

CROSS REFERENCE TO RELATED APPLICATION

This application claims the benefit of priority to U.S. Provisional Patent Application No. 62/799,514, filed on Jan. 31, 2019, the entire contents of which being incorporated herein by reference.

FIELD OF THE DISCLOSURE

The present disclosure relates to a method for integrating driving images acquired from vehicles performing a cooperative driving and a driving image integrating device using the same; and more particularly, to the method for integrating the driving images acquired from the vehicles in order to perform robust recognition of objects in the driving images by fusion of multiple pieces of object detection information detected from the driving images, and the driving image integrating device using the same.

BACKGROUND OF THE DISCLOSURE

Deep learning is a field of machine learning and artificial neural networks based on a set of algorithms that model a high level of abstraction in data using deep graphs with multiple processing layers. A common deep learning architecture can include many neural layers and millions of parameters. These parameters can be learned from large amounts of data on computers equipped with high-speed GPUs through new learning techniques that can work with many layers, such as ReLU, dropout, data augmentation and stochastic gradient descent (SGD).

Among existing deep learning architectures, CNN (convolutional neural network) is one of the most widely used deep learning architectures. The concept of CNN has been known for over 20 years, but a real power of CNN has not been recognized until after a recent deep learning theory has been developed. Currently, CNN has been successful in many artificial intelligence and machine learning applications, such as face recognition, image classification, image caption generation, object detection, visual question-and-answer and autonomous vehicles.

Particularly, object detection technology in the autonomous vehicles is widely used for detecting other vehicles, pedestrians, lanes, traffic lights, etc. on a road, and is also used for detecting various objects for autonomous driving as the case may be.

In addition to the autonomous vehicles, the object detection technology is also used in military, surveillance, and other fields.

However, in a conventional object detection technology, there is a problem that recognition results for objects vary depending on a performance of an applied object detector, and it is difficult to confirm whether the recognized results are optimal.

In addition, the conventional object detection technology has a problem that the performance varies depending on surrounding environment.

SUMMARY OF THE DISCLOSURE

It is an object of the present disclosure to solve all the aforementioned problems.

It is another object of the present disclosure to improve recognition results of an object detector.

It is still another object of the present disclosure to detect objects accurately without regard to surrounding environment.

In accordance with one aspect of the present disclosure, there is provided a method for integrating driving images acquired from one or more vehicles performing a cooperative driving, including steps of: (a) a main driving image integrating device, installed on at least one main vehicle among said one or more vehicles, performing (i) a process of inputting at least one main driving image, acquired from at least one main camera installed on the main vehicle, into a main object detector, to thereby allow the main object detector to (i-1) generate at least one main feature map by applying at least one convolution operation to the main driving image via a main convolutional layer, (i-2) generate one or more main ROIs (Regions Of Interest), corresponding to one or more regions where one or more main objects are estimated as located, on the main feature map, via a main region proposal network, (i-3) generate one or more main pooled feature maps by applying at least one pooling operation to one or more regions, corresponding to the main ROIs, on the main feature map, via a main pooling layer, and (i-4) generate multiple pieces of main object detection information on the main objects located on the main driving image by applying at least one fully-connected operation to the main pooled feature maps via a main fully connected layer; (b) the main driving image integrating device performing a process of inputting the main pooled feature maps into a main confidence network, to thereby allow the main confidence network to generate each of one or more main confidences of each of the main ROIs corresponding to each of the main pooled feature maps; and (c) the main driving image integrating device performing a process of acquiring multiple pieces of sub-object detection information and one or more sub-confidences from each of one or more sub-vehicles in the cooperative driving, and a process of integrating the multiple pieces of the main object detection information and the multiple pieces of the sub-object detection information by using the main confidences and the sub-confidences as weights, to thereby generate at least one object detection result of the main driving image, wherein the multiple pieces of the sub-object detection information and the sub-confidences are generated by each of one or more sub-driving image integrating devices, installed on each of the sub-vehicles, and wherein each of the sub-driving image integrating devices performs (i) a process of inputting each of sub-driving images into corresponding each of sub-object detectors, to thereby allow said each of the sub-object detectors to (i-1) generate each of sub-feature maps by applying at least one convolution operation to each of the sub-driving images via corresponding each of sub-convolutional layers, (i-2) generate one or more sub-ROIs, corresponding to one or more regions where one or more sub-objects are estimated as located, on each of the sub-feature maps, via corresponding each of sub-region proposal networks, (i-3) generate each of one or more sub-pooled feature maps by applying at least one pooling operation to one or more regions, corresponding to each of the sub-ROIs, on each of the sub-feature maps, via corresponding each of sub-pooling layers, (i-4) generate the multiple pieces of the sub-object detection information on the sub-objects located on each of the sub-driving images by applying at least one fully-connected operation to each of the sub-pooled feature maps via corresponding each of sub-fully connected layers, and (i-5) input each of the sub-pooled feature maps into corresponding each of sub-confidence networks, to thereby allow each of the sub-confidence networks to generate the sub-confidences of the sub-ROIs corresponding to each of the sub-pooled feature maps.

As one example, the main object detector and the main confidence network have been learned by a learning device, wherein the learning device has learned the main object detector by performing, if training data including one or more driving images for training are acquired, (i) a process of sampling (i-1) 1-st training data including a (1_1)-st driving image for training to a (1_m)-th driving image for training wherein m is an integer larger than 0 and (i-2) 2-nd training data including a (2_1)-st driving image for training to a (2_n)-th driving image for training, from the training data wherein n is an integer larger than 0, (ii) a process of inputting a (1_j)-th driving image for training, among the (1_1)-st driving image for training to the (1_m)-th driving image for training, into the main convolutional layer, to thereby allow the main convolutional layer to generate at least one 1-st feature map by applying at least one convolution operation to the (1_j)-th driving image for training, (iii) a process of inputting the 1-st feature map into the main region proposal network, to thereby allow the main region proposal network to generate one or more 1-st ROIs, corresponding to one or more objects for training, on the 1-st feature map, (iv) a process of instructing the main pooling layer to generate one or more 1-st pooled feature maps by applying at least one pooling operation to one or more regions, corresponding to the 1-st ROIs, on the 1-st feature map, (v) a process of instructing the main fully connected layer to generate multiple pieces of 1-st object detection information corresponding to the objects for training located on the (1_j)-th driving image for training by applying at least one fully-connected operation to the 1-st pooled feature maps or at least one 1-st feature vector corresponding to the 1-st pooled feature maps, (vi) a process of instructing a 1-st loss layer to calculate one or more 1-st losses by referring to the multiple pieces of the 1-st object detection information and at least one object ground truth of the (1_j)-th driving image for training, and (vii) a process of updating at least one parameter of the main fully connected layer and the main convolutional layer via backpropagation using the 1-st losses such that the 1-st losses are minimized, for each of the (1_1)-st driving image for training to the (1_m)-th driving image for training, and wherein the learning device has learned the main confidence network by performing (i) a process of acquiring each of one or more 1-st confidences of each of the 1-st ROIs by referring to the object ground truth and the multiple pieces of the 1-st object detection information corresponding to each of the (1_1)-st driving image for training to the (1_m)-th driving image for training, (ii) a process of inputting a (2_k)-th driving image for training, among the (2_1)-st driving image for training to the (2_n)-th driving image for training, into the main convolutional layer, to thereby allow the main convolutional layer to generate at least one 2-nd feature map by applying at least one convolution operation to the (2_k)-th driving image for training, (iii) a process of inputting the 2-nd feature map into the main region proposal network, to thereby allow the main region proposal network to generate one or more 2-nd ROIs corresponding to the objects for training located on the 2-nd feature map, (iv) a process of instructing the main pooling layer to generate one or more 2-nd pooled feature maps by applying at least one pooling operation to one or more regions, corresponding to the 2-nd ROIs, on the 2-nd feature map, (v) a process of inputting the 2-nd pooled feature maps into the main confidence network, to thereby allow the main confidence network to generate one or more 2-nd confidences corresponding to the 2-nd pooled feature maps through deep learning, (vi) a process of instructing a 2-nd loss layer to calculate one or more 2-nd losses by referring to the 2-nd confidences and the 1-st confidences, and (vii) a process of updating at least one parameter of the main confidence network via backpropagation using the 2-nd losses such that the 2-nd losses are minimized, for each of the (2_1)-st driving image for training to the (2_n)-th driving image for training.

As one example, the learning device acquires the 1-st confidences of each of the 1-st ROIs by referring to the multiple pieces of the 1-st object detection information and their object ground truths, wherein each of the 1-st confidences is 0 if each of the objects for training is absent in each of the 1-st ROIs, and each of the 1-st confidences is "1-box_error×class_error" if said each of the objects for training is present in said each of the 1-st ROIs, and wherein each box_error is each error of bounding boxes included in the multiple pieces of the 1-st object detection information, and each class_error is each error of class information included in the multiple pieces of the 1-st object detection information.

As one example, (i) said each box_error is each ratio of (i-1) each size of each of the objects for training to (i-2) a summation of errors of each of center points of the bounding boxes, and (ii) said each class_error is each summation of class errors of each estimation value on each class, to be used for classifying each of the objects for training, included in the multiple pieces of the 1-st object detection information.

As one example, in order to integrate the multiple pieces of the main object detection information and the multiple pieces of the sub-object detection information by using the main confidences and the sub-confidences as weights, the main driving image integrating device performs (i) a process of weighted summation of each estimation value on each class included in each piece of the specific object detection information by using each of specific confidences, corresponding to each piece of the specific object detection information, among the main confidences and the sub-confidences, as each weight, and a process of acquiring a specific class having a highest value, among weight-summed classes, as optimal class information corresponding to the specific object, and (ii) a process of weighted summation of each piece of specific regression information included in each piece of the specific object detection information by using each of the specific confidences corresponding to each piece of the specific object detection information as weights, and a process of acquiring weight-summed regression information as optimal regression information corresponding to the specific object.

As one example, in order to integrate the multiple pieces of the main object detection information and the multiple pieces of the sub-object detection information by using the main confidences and the sub-confidences as weights, if 1-st overlapping object detection information among the 1-st object detection information and 2-nd overlapping object detection information among the 2-nd object detection information are determined as present which overlap each other, the main driving image integrating device performs (i) a process of determining that the 1-st overlapping object detection information and the 2-nd overlapping object detection information correspond to the specific object if an intersection over union of a 1-st bounding box corresponding to the 1-st overlapping object detection information and a 2-nd bounding box corresponding to the 2-nd overlapping object detection information is equal to or greater than a preset threshold, and (ii) a process of determining that the 1-st overlapping object detection information and the 2-nd overlapping object detection information correspond to different objects if the intersection over union is less than the preset threshold.

In accordance with another aspect of the present disclosure, there is provided a main driving image integrating device, installed on at least one main vehicle among one or more vehicles in a cooperative driving, for integrating driving images acquired from the vehicles, including: at least one memory that stores instructions; and at least one processor configured to execute the instructions to perform or support another device to perform: (I) a process of inputting at least one main driving image, acquired from at least one main camera installed on the main vehicle, into a main object detector, to thereby allow the main object detector to (I-1) generate at least one main feature map by applying at least one convolution operation to the main driving image via a main convolutional layer, (I-2) generate one or more main ROIs (Regions Of Interest), corresponding to one or more regions where one or more main objects are estimated as located, on the main feature map, via a main region proposal network, (I-3) generate one or more main pooled feature maps by applying at least one pooling operation to one or more regions, corresponding to the main ROIs, on the main feature map, via a main pooling layer, and (I-4) generate multiple pieces of main object detection information on the main objects located on the main driving image by applying at least one fully-connected operation to the main pooled feature maps via a main fully connected layer, (II) a process of inputting the main pooled feature maps into a main confidence network, to thereby allow the main confidence network to generate each of one or more main confidences of each of the main ROIs corresponding to each of the main pooled feature maps, and (II) a process of acquiring multiple pieces of sub-object detection information and one or more sub-confidences from each of one or more sub-vehicles in the cooperative driving, and a process of integrating the multiple pieces of the main object detection information and the multiple pieces of the sub-object detection information by using the main confidences and the sub-confidences as weights, to thereby generate at least one object detection result of the main driving image, wherein the multiple pieces of the sub-object detection information and the sub-confidences are generated by each of one or more sub-driving image integrating devices, installed on each of the sub-vehicles, and wherein each of the sub-driving image integrating devices performs (i) a process of inputting each of sub-driving images into corresponding each of sub-object detectors, to thereby allow said each of the sub-object detectors to (i-1) generate each of sub-feature maps by applying at least one convolution operation to each of the sub-driving images via corresponding each of sub-convolutional layers, (i-2) generate one or more sub-ROIs, corresponding to one or more regions where one or more sub-objects are estimated as located, on each of the sub-feature maps, via corresponding each of sub-region proposal networks, (i-3) generate each of one or more sub-pooled feature maps by applying at least one pooling operation to one or more regions, corresponding to each of the sub-ROIs, on each of the sub-feature maps, via corresponding each of sub-pooling layers, (i-4) generate the multiple pieces of the sub-object detection information on the sub-objects located on each of the sub-driving images by applying at least one fully-connected operation to each of the sub-pooled feature maps via corresponding each of sub-fully connected layers, and (i-5) input each of the sub-pooled feature maps into corresponding each of sub-confidence networks, to thereby allow each of the sub-confidence networks to generate the sub-confidences of the sub-ROIs corresponding to each of the sub-pooled feature maps.

As one example, the main object detector and the main confidence network have been learned by a learning device, wherein the learning device has learned the main object detector by performing, if training data including one or more driving images for training are acquired, (i) a process of sampling (i-1) 1-st training data including a (1_1)-st driving image for training to a (1_m)-th driving image for training wherein m is an integer larger than 0 and (i-2) 2-nd training data including a (2_1)-st driving image for training to a (2_n)-th driving image for training, from the training data, wherein n is an integer larger than 0, (ii) a process of inputting a (1_j)-th driving image for training, among the (1_1)-st driving image for training to the (1_m)-th driving image for training, into the main convolutional layer, to thereby allow the main convolutional layer to generate at least one 1-st feature map by applying at least one convolution operation to the (1_j)-th driving image for training, (iii) a process of inputting the 1-st feature map into the main region proposal network, to thereby allow the main region proposal network to generate one or more 1-st ROIs, corresponding to one or more objects for training, on the 1-st feature map, (iv) a process of instructing the main pooling layer to generate one or more 1-st pooled feature maps by applying at least one pooling operation to one or more regions, corresponding to the 1-st ROIs, on the 1-st feature map, (v) a process of instructing the main fully connected layer to generate multiple pieces of 1-st object detection information corresponding to the objects for training located on the (1_j)-th driving image for training by applying at least one fully-connected operation to the 1-st pooled feature maps or at least one 1-st feature vector corresponding to the 1-st pooled feature maps, (vi) a process of instructing a 1-st loss layer to calculate one or more 1-st losses by referring to the multiple pieces of the 1-st object detection information and at least one object ground truth of the (1_j)-th driving image for training, and (vii) a process of updating at least one parameter of the main fully connected layer and the main convolutional layer via backpropagation using the 1-st losses such that the 1-st losses are minimized, for each of the (1_1)-st driving image for training to the (1_m)-th driving image for training, and wherein the learning device has learned the main confidence network by performing (i) a process of acquiring each of one or more 1-st confidences of each of the 1-st ROIs by referring to the object ground truth and the multiple pieces of the 1-st object detection information corresponding to each of the (1_1)-st driving image for training to the (1_m)-th driving image for training, (ii) a process of inputting a (2_k)-th driving image for training, among the (2_1)-st driving image for training to the (2_n)-th driving image for training, into the main convolutional layer, to thereby allow the main convolutional layer to generate at least one 2-nd feature map by applying at least one convolution operation to the (2_k)-th driving image for training, (iii) a process of inputting the 2-nd feature map into the main region proposal network, to thereby allow the main region proposal network to generate one or more 2-nd ROIs corresponding to the objects for training located on the 2-nd feature map, (iv) a process of instructing the main pooling layer to generate one or more 2-nd pooled feature maps by applying at least one pooling operation to one or more regions, corresponding to the 2-nd ROIs, on the 2-nd feature map, (v) a process of inputting the 2-nd pooled feature maps into the main confidence network, to thereby allow the main confidence network to generate one or more 2-nd confidences corresponding to the 2-nd pooled feature maps through deep learning, (vi) a process of instructing a 2-nd loss layer to calculate one or more 2-nd losses by referring to the 2-nd confidences and the 1-st confidences, and (vii) a process of updating at least one parameter of the main confidence network via backpropagation using the 2-nd losses such that the 2-nd losses are minimized, for each of the (2_1)-st driving image for training to the (2_n)-th driving image for training.

As one example, the learning device acquires the 1-st confidences of each of the 1-st ROIs by referring to the multiple pieces of the 1-st object detection information and their object ground truths, wherein each of the 1-st confidences is 0 if each of the objects for training is absent in each of the 1-st ROIs, and each of the 1-st confidences is "1-box_error×class_error" if said each of the objects for training is present in said each of the 1-st ROIs, and wherein each box_error is each error of bounding boxes included in the multiple pieces of the 1-st object detection information, and each class_error is each error of class information included in the multiple pieces of the 1-st object detection information.

As one example, (i) said each box_error is each ratio of (i-1) each size of each of the objects for training to (i-2) a summation of errors of each of center points of the bounding boxes, and (ii) said each class_error is each summation of class errors of each estimation value on each class, to be used for classifying each of the objects for training, included in the multiple pieces of the 1-st object detection information.

As one example, in order to integrate the multiple pieces of the main object detection information and the multiple pieces of the sub-object detection information by using the main confidences and the sub-confidences as weights, the processor performs (i) a process of weighted summation of each estimation value on each class included in each piece of the specific object detection information by using each of specific confidences, corresponding to each piece of the specific object detection information, among the main confidences and the sub-confidences, as each weight, and a process of acquiring a specific class having a highest value, among weight-summed classes, as optimal class information corresponding to the specific object, and (ii) a process of weighted summation of each piece of specific regression information included in each piece of the specific object detection information by using each of the specific confidences corresponding to each piece of the specific object detection information as weights, and a process of acquiring weight-summed regression information as optimal regression information corresponding to the specific object.

As one example, in order to integrate the multiple pieces of the main object detection information and the multiple pieces of the sub-object detection information by using the main confidences and the sub-confidences as weights, if 1-st overlapping object detection information among the 1-st object detection information and 2-nd overlapping object detection information among the 2-nd object detection information are determined as present which overlap each other, the processor performs (i) a process of determining that the 1-st overlapping object detection information and the 2-nd overlapping object detection information correspond to the specific object if an intersection over union of a 1-st bounding box corresponding to the 1-st overlapping object detection information and a 2-nd bounding box corresponding to the 2-nd overlapping object detection information is equal to or greater than a preset threshold, and (ii) a process of determining that the 1-st overlapping object detection information and the 2-nd overlapping object detection information correspond to different objects if the intersection over union is less than the preset threshold.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
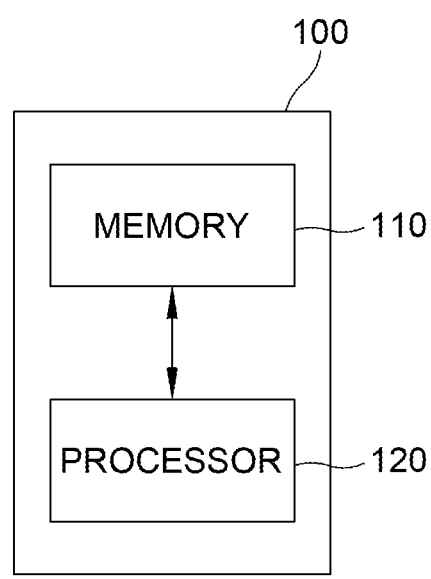
FIG. 1 is a drawing schematically illustrating a driving image integrating device to be used for integrating driving images acquired from vehicles in a cooperative driving in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

To allow those skilled in the art to carry out the present disclosure easily, the example embodiments of the present disclosure by referring to attached diagrams will be explained in detail as shown below.

The description below discloses an example of vehicles, but the scope of the present disclosure is not limited thereto, and the present disclosure may be applied to any field where one or more cameras detect one or more objects in at least one certain regions, such as fields of military, surveillance, etc.

FIG. 1 is a drawing schematically illustrating a driving image integrating device to be used for integrating one or more driving images acquired from one or more vehicles in a cooperative driving in accordance with one example embodiment of the present disclosure. By referring to FIG. 1, the driving image integrating device 100 may include a memory 110 for storing instructions to integrate the driving images acquired from the vehicles in the cooperative driving and a processor 120 for performing processes according to the instructions in the memory 110 to integrate the driving images acquired from the vehicles in the cooperative driving.

Specifically, the driving image integrating device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

A method for integrating the driving images acquired from the vehicles in the cooperative driving by using the driving image integrating device 100 in accordance with one example embodiment of the present disclosure is described as follows.

Figure 2:
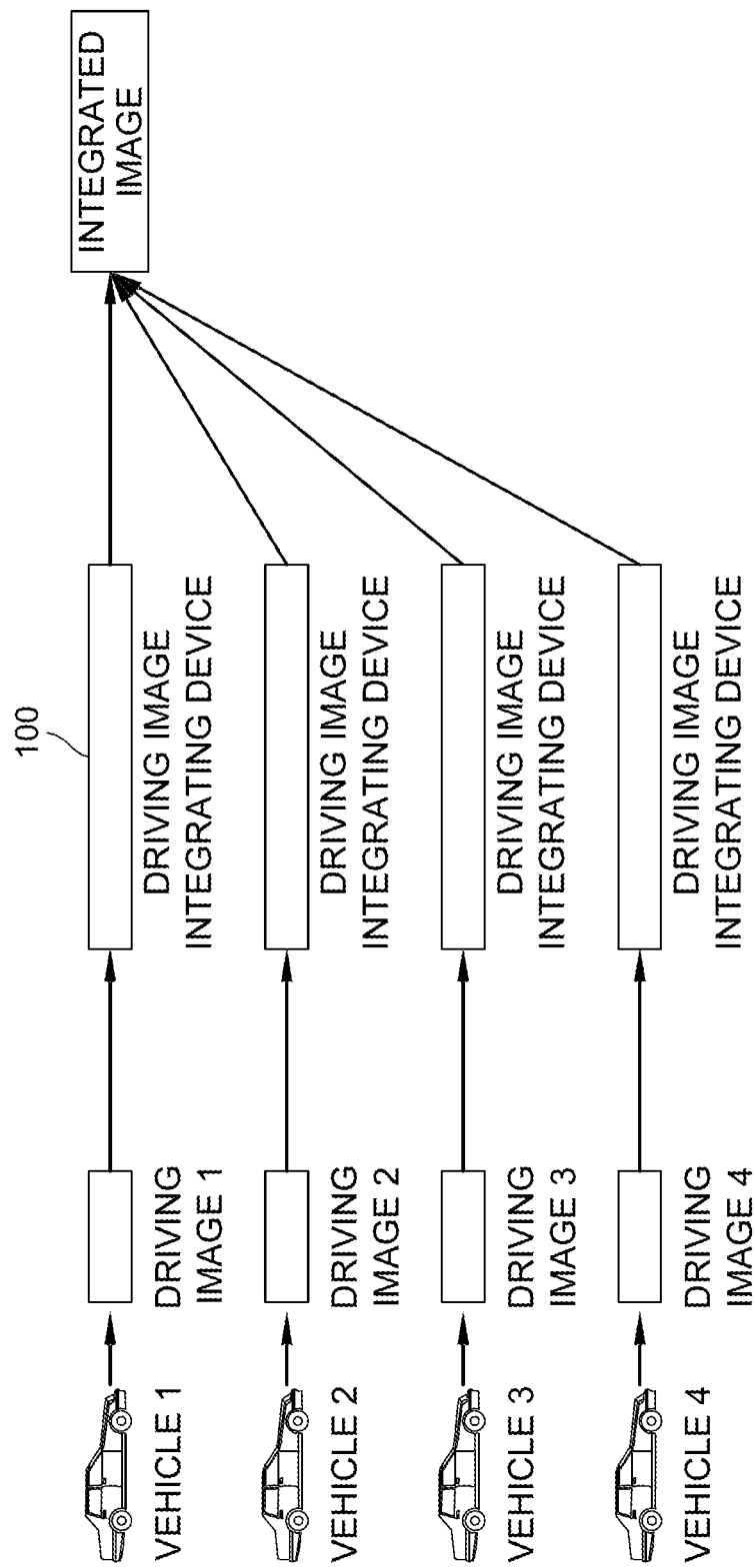
FIG. 2 is a drawing schematically illustrating a process of integrating the driving images while the vehicles are cooperatively driven, where each of driving image integrating devices to be used for integrating the driving images acquired from the vehicles in the cooperative driving are installed, in accordance with one example embodiment of the present disclosure.

First, by referring to FIG. 2, each of one or more driving image integrating devices 100 on each of the vehicles in the cooperative driving on a road may detect one or more objects on one or more driving images taken by one or more cameras installed on each of the vehicles, to thereby generate each of one or more confidences corresponding to each of the detected objects. Herein, the objects may include any objects in driving environment, such as one or more vehicles, one or more pedestrians, one or more traffic lights, one or more traffic lanes, one or more guard rails, etc.

And, each of the driving image integrating devices 100 on each of the vehicles may share (i) information on the detected objects, e.g., object detection information, including class information and regression information on each of the objects, and (ii) each of the confidences corresponding to each piece of the object detection information, with one or more sub-vehicles nearby via V2V communication.

Then, each of the driving image integrating devices 100 on each of the vehicles may integrate recognition results of all of the vehicles in the cooperative driving by using its object detection information and its confidence, and received object detection information and received confidences from the sub-vehicles, to thereby generate at least one optimal object detection result.

Figure 3:
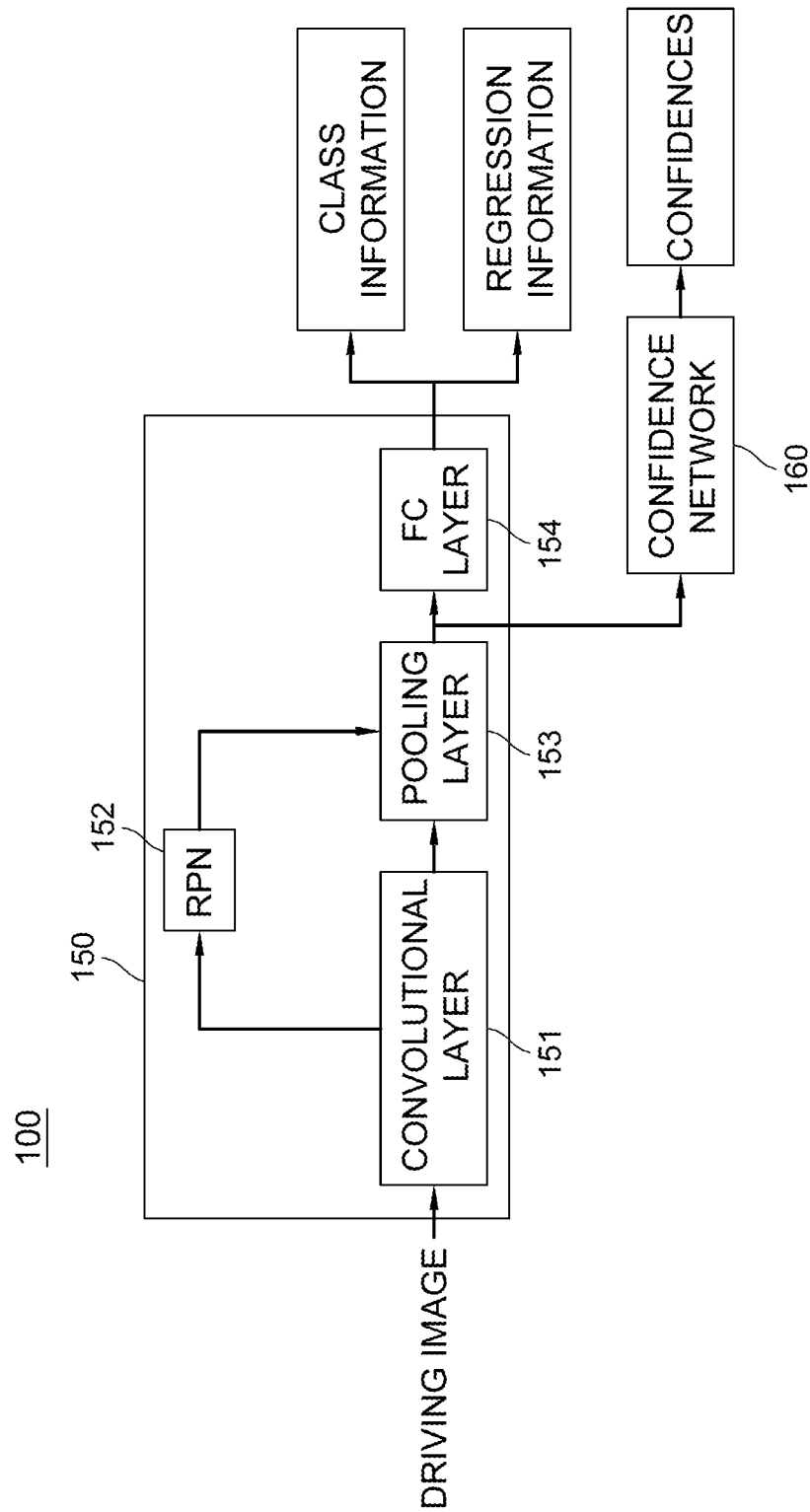
FIG. 3 is a drawing schematically illustrating a method for integrating the driving images acquired from the vehicles in the cooperative driving in accordance with one example embodiment of the present disclosure.

Herein, by referring to FIG. 3, a process of a main driving image integrating device 100 installed on a main vehicle among the vehicles in the cooperative driving is described as follows. Throughout the present disclosure, prefixes "main" and "sub" represent relative perspectives. Among multiple entities, if at least one specific entity is designated as a main entity, e.g., a main object for testing or a main object for training, then the rest of the entities may be designated as sub-entities, e.g., sub-objects for testing or sub-objects for training respectively, and any of the entities can be the main entity.

First, the main driving image integrating device 100 installed on the main vehicle among all the vehicles in the cooperative driving may perform a process of inputting at least one main driving image, acquired from at least one main camera installed on the main vehicle, into a main object detector 150.

Then, the main object detector 150 may input the main driving image into a main convolutional layer 151, to thereby allow the main convolutional layer 151 to generate at least one main feature map by applying at least one convolution operation to the main driving image. The terms "main" and "sub" are omitted in the drawing, since, for example, a designation of 151 in FIG. 5 corresponds not only to the main convolutional layer but also to sub-convolutional layers. However, the "main" and "sub" are used in the detailed description for convenience of understanding.

And, the main object detector 150 may input the main feature map into a main region proposal network (RPN) 152, to thereby allow the main region proposal network 152 to generate one or more main ROIs (Regions Of Interest), corresponding to one or more regions where at least one main object is estimated as located, on the main feature map. For reference, throughout the present disclosure, the phrase "for training" or "training" is added for terms related to the learning process, and the phrase "for testing" or "testing" is added for terms related to the testing process, to avoid possible confusion. Also, in case of the main object and sub-objects, the main object represents a main object for testing, and the sub-objects represent sub-objects for testing, but "for testing" is omitted for convenience.

And, the main object detector 150 may input the main ROIs and the main feature map into a main pooling layer 153, to thereby allow the main pooling layer 153 to generate one or more main pooled feature maps by applying at least one pooling operation to one or more regions, corresponding to the main ROIs, on the main feature map.

And, the main object detector 150 may input the main pooled feature maps into a main fully connected layer 154, to thereby allow the main fully connected layer 154 to generate multiple pieces of main object detection information on the main object located on the main driving image by applying at least one fully-connected operation to the main pooled feature maps.

Herein, the main object detector 150 may input at least one main feature vector, created by converting the main pooled feature maps into at least one vector, into the main fully connected layer 154.

And, each piece of the main object detection information may include regression information and class information corresponding to the main object. Also, the class information on the main object may include each estimation value on each of classes to be used for classifying the main object by the main fully connected layer 154, and the regression information on the main object may include location information, i.e., the location information on bounding boxes, created by regression of locations of the main ROIs corresponding to each of the main pooled feature maps.

Next, the main driving image integrating device 100 may perform a process of inputting the main pooled feature maps into a main confidence network 160, to thereby allow the main confidence network 160 to generate each of one or more main confidences of each of the main ROIs corresponding to each of the main pooled feature maps. Herein, the main confidence network 160 may have been learned to output the main confidences of each of the main ROIs, and as a result, the main confidences, corresponding to each of the main pooled feature maps, may be generated according to at least one parameter learned by using deep learning. A process of learning the main confidence network 160 will be described later.

Next, the main driving image integrating device 100 may perform a process of acquiring multiple pieces of sub-object detection information and one or more sub-confidences from each of one or more sub-vehicles in the cooperative driving over the V2V communication, and a process of integrating the multiple pieces of the main object detection information and the multiple pieces of the sub-object detection information by using the main confidences and the sub-confidences as weights, to thereby generate at least one object detection result of the main driving image.

Herein, in order to perform the process of integrating the multiple pieces of the main object detection information and the multiple pieces of the sub-object detection information by using the main confidences and the sub-confidences as the weights, if multiple pieces of object detection information corresponding to a specific object, which is one of the main object and the sub-objects, are determined as present, the main driving image integrating device 100 may perform (i) a process of weighted summation of each estimation value on each class included in each piece of the specific object detection information by using each of specific confidences, corresponding to each piece of the specific object detection information, among the main confidences and the sub-confidences, as each weight, and a process of acquiring a specific class having a highest value, among weight-summed classes, as optimal class information corresponding to the specific object, and (ii) a process of weighted summation of each piece of specific regression information included in each piece of the specific object detection information by using each of the specific confidences corresponding to each piece of the specific object detection information as weights, and a process of acquiring the weight-summed regression information as optimal regression information corresponding to the specific object.

As one example, supposing that the main fully connected layer 154 classifies the specific object into a vehicle, a pedestrian, or a motorcycle, (i) 1-st class information, included in the main object detection information, i.e., 1-st object detection information, may have a $(1\_1)$-st estimation value representing that the specific object is estimated as the vehicle, a $(1\_2)$-nd estimation value representing that the specific object is estimated as the pedestrian, and a $(1\_3)$-rd estimation value representing that the specific object is estimated as the motorcycle, (ii) 2-nd class information, included in 2-nd object detection information acquired from one of the sub-vehicles, may have a $(2\_1)$-st estimation value representing that the specific object is estimated as the vehicle, a $(2\_2)$-nd estimation value representing that the specific object is estimated as the pedestrian, and a $(2\_3)$-rd estimation value representing that the specific object is estimated as the motorcycle, and (iii) 3-rd class information, included in 3-rd object detection information acquired from another one of the sub-vehicles, may have a $(3\_1)$-st estimation value representing that the specific object is estimated as the vehicle, a $(3\_2)$-nd estimation value representing that the specific object is estimated as the pedestrian, and a $(3\_3)$-rd estimation value representing that the specific object is estimated as the motorcycle. And, supposing that a confidence corresponding to the 1-st object detection information is a 1-st confidence, a confidence corresponding to the 2-nd object detection information is a 2-nd confidence, and a confidence corresponding to the 3-rd object detection information is a 3-rd confidence, then integrated class information on the specific object which is integrated by the main driving image integrating device 100 may be a weighted summation of each estimation value per each class by using each confidence as each weight, such that an integration estimation value, representing that the specific object is estimated as the vehicle, may be "$((1\_1)$-st estimation value×1-st confidence$)+(2\_1)$-st estimation value×2-nd confidence$)+(3\_1)$-st estimation value×3-rd confidence$)$", an integration estimation value, representing that the specific object is estimated as the pedestrian, may be "$((1\_2)$-nd estimation value×1-st confidence$)+(2\_2)$-nd estimation value×2-nd confidence$)+(3\_2)$-nd estimation value×3-rd confidence$)$", and an integration estimation value, representing that the specific object is estimated as the motorcycle, may be "((1_3)-rd estimation value×1-st confidence)+(2_3)-rd estimation value×2-nd confidence)+(3_3)-rd estimation value×3-rd confidence)". And as a result, the specific class, having a highest value among weight-summed estimation values, may be acquired as the optimal class information corresponding to the specific object on an integrated image. Herein, the 1-st object detection information corresponds to the main object.

Also, specific regression information, that is, location information on the bounding boxes of the specific object may be weight-summed by using the specific confidences as weights in a similar way, and weight-summed regression information may be determined as the optimal regression information corresponding to the specific object. Herein, the bounding boxes of the specific object may be generated by bounding ROIs, where the specific object is estimated as located.

Also, in order to integrate the multiple pieces of the main object detection information and the multiple pieces of the sub-object detection information by using the main confidences and the sub-confidences as weights, if 1-st overlapping object detection information among the 1-st object detection information and 2-nd overlapping object detection information among the 2-nd object detection information are determined as present which overlap each other, the main driving image integrating device 100 may perform (i) a process of determining that the 1-st overlapping object detection information and the 2-nd overlapping object detection information correspond to the specific object if an intersection over union of a 1-st bounding box corresponding to the 1-st overlapping object detection information and a 2-nd bounding box corresponding to the 2-nd overlapping object detection information is equal to or greater than a preset threshold, and (ii) a process of determining that the 1-st overlapping object detection information and the 2-nd overlapping object detection information correspond to different objects if the intersection over union is less than the preset threshold.

Meanwhile, the multiple pieces of the sub-object detection information and the sub-confidences may be generated by each of one or more sub-driving image integrating devices, installed on each of the sub-vehicles. In detail, each of the sub-driving image integrating devices may perform (i) a process of inputting each of one or more sub-driving images into corresponding each of sub-object detectors, to thereby allow said each of the sub-object detectors to (i-1) generate each of sub-feature maps by applying at least one convolution operation to each of the sub-driving images via corresponding each of sub-convolutional layers, (i-2) generate one or more sub-ROIs, corresponding to one or more regions where one or more sub-objects are estimated as located, on each of the sub-feature maps, via corresponding each of sub-region proposal networks, (i-3) generate each of one or more sub-pooled feature maps by applying at least one pooling operation to one or more regions, corresponding to each of the sub-ROIs, on each of the sub-feature maps, via corresponding each of sub-pooling layers, (i-4) generate the multiple pieces of the sub-object detection information on the sub-objects located on each of the sub-driving images by applying at least one fully-connected operation to each of the sub-pooled feature maps via corresponding each of sub-fully connected layers, and (i-5) input each of the sub-pooled feature maps into corresponding each of sub-confidence networks, to thereby allow each of the sub-confidence networks to generate the sub-confidences of the sub-ROIs corresponding to each of the sub-pooled feature maps.

Figure 4:
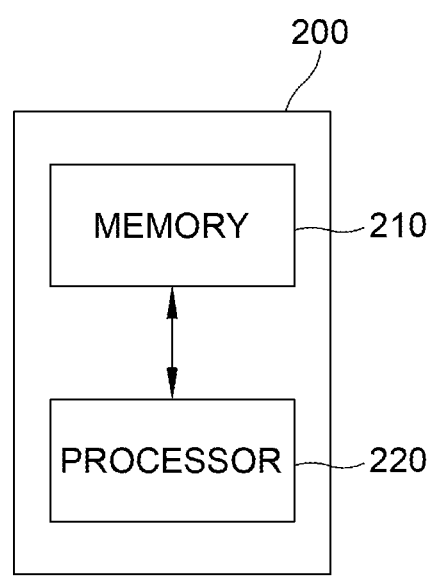
FIG. 4 is a drawing schematically illustrating a learning device for learning the driving image integrating device to be used for integrating the driving images acquired from the vehicles in the cooperative driving in accordance with one example embodiment of the present disclosure.

FIG. 4 is a drawing schematically illustrating a learning device for learning the driving image integrating device to be used for integrating the driving images acquired from the vehicles in the cooperative driving in accordance with one example embodiment of the present disclosure. By referring to FIG. 4, the learning device 200 may include a memory 210 for storing instructions to learn the driving image integrating device for integrating the driving images acquired from the vehicles in the cooperative driving and a processor 220 for performing processes according to the instructions in the memory 210 to learn the driving image integrating device for integrating the driving images acquired from the vehicles in the cooperative driving.

Specifically, the learning device 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Figure 5:
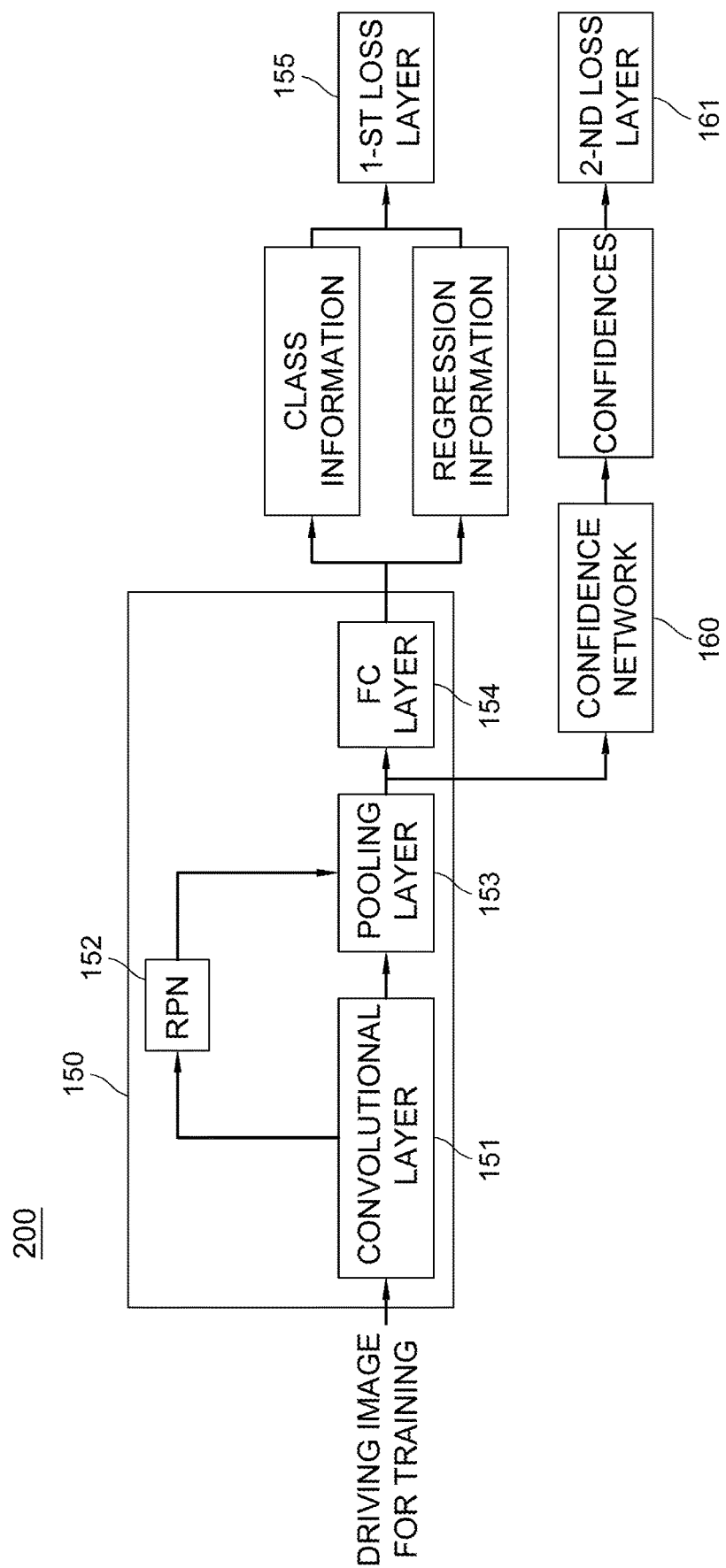
FIG. 5 is a drawing schematically illustrating a learning method for learning the driving image integrating device to be used for integrating the driving images acquired from the vehicles in the cooperative driving in accordance with one example embodiment of the present disclosure.

A method for learning the driving image integrating device to be used for integrating the driving images acquired from the vehicles in the cooperative driving by using the learning device 200 in accordance with one example embodiment of the present disclosure is described by referring to FIG. 5 as follows. A process of learning the main driving image integrating device installed on the main vehicle among the vehicles in the cooperative driving is described as follows.

First, if training data including one or more driving images for training are acquired, the learning device 200 may perform (i) a process of sampling (i-1) 1-st training data including a (1_1)-st driving image for training to a (1_m)-th driving image for training, and (i-2) 2-nd training data including a (2_1)-st driving image for training to a (2_n)-th driving image for training, from the training data. Herein, m and n may be integers larger than 0, respectively.

And, the learning device 200 may perform (ii) a process of inputting a (1_j)-th driving image for training, among the (1_1)-st driving image for training to the (1_m)-th driving image for training, into the main convolutional layer 151, to thereby allow the main convolutional layer 151 to generate at least one 1-st feature map by applying at least one convolution operation to the (1_j)-th driving image for training, and (iii) a process of inputting the 1-st feature map into the main region proposal network 152, to thereby allow the main region proposal network 152 to generate one or more 1-st ROIs, corresponding to one or more objects for training, on the 1-st feature map.

Thereafter, the learning device 200 may perform (iv) a process of inputting the 1-st ROIs and the 1-st feature map into the main pooling layer 153, to thereby allow the main pooling layer 153 to generate one or more 1-st pooled feature maps by applying at least one pooling operation to one or more regions, corresponding to the 1-st ROIs, on the 1-st feature map, and (v) a process of inputting the 1-st pooled feature maps or at least one 1-st feature vector created from the 1-st pooled feature maps into the main fully connected layer 154, to thereby allow the main fully connected layer 154 to generate multiple pieces of 1-st object detection information corresponding to the objects for training located on the (1_j)-th driving image for training by applying at least one fully-connected operation to the 1-st pooled feature maps or the 1-st feature vector corresponding to the 1-st pooled feature maps. Herein, each piece of the 1-st object detection information may include class information and regression information corresponding to the objects for training. And, the class information on the objects for training may include each estimation value on each of the classes to be used for classifying the objects for training by the main fully connected layer 154, and the regression information on the objects for training may include the location information, i.e., the location information on bounding boxes, created by the regression of the locations of the main ROIs corresponding to each of the main pooled feature maps.

And, the learning device 200 may perform (vi) a process of instructing a 1-st loss layer 155 to calculate one or more 1-st losses by referring to the multiple pieces of the 1-st object detection information and at least one object ground truth of the (1_j)-th driving image for training, and (vii) a process of updating at least one parameter of the main fully connected layer and the main convolutional layer via backpropagation using the 1-st losses such that the 1-st losses are minimized, for each of the (1_1)-st driving image for training to the (1_m)-th driving image for training, and as a result, may learn the main object detector.

Next, the learning device 200 may perform (i) a process of acquiring each of one or more 1-st confidences of each of the 1-st ROIs by referring to the multiple pieces of the 1-st object detection information and their corresponding object ground truths, corresponding to each of the (1_1)-st driving image for training to the (1_m)-th driving image for training.

Herein, the learning device 200 may acquire each of the 1-st confidences of each of the 1-st ROIs by referring to the multiple pieces of the 1-st object detection information and their object ground truths, where each of the 1-st confidences is 0 if each of the objects for training is absent in each of the 1-st ROIs and where each of the 1-st confidences is "1−box_error×class_error" if said each of the objects for training is present in said each of the 1-st ROIs.

And each box_error may be each error of the bounding boxes included in the multiple pieces of the 1-st object detection information, and each class_error may be each error of class information included in the multiple pieces of the 1-st object detection information.

Also, said each box_error may be each ratio of (i-1) each size of each of the objects for training to (i-2) a summation of errors of each of center points of the bounding boxes, and said each class_error may be each summation of class errors of each estimation value on each class, to be used for classifying each of the objects for training, included in the multiple pieces of the 1-st object detection information.

That is, $$\text{box\_error} = \frac{\text{sum}(pointerror)}{\text{object size}},$$

and class_error=sum(classProberror).

Next, the learning device 200 may perform (ii) a process of inputting a (2_k)-th driving image for training, among the (2_1)-st driving image for training to the (2_n)-th driving image for training, into the main convolutional layer 151, to thereby allow the main convolutional layer 151 to generate at least one 2-nd feature map by applying at least one convolution operation to the (2_k)-th driving image for training, and (iii) a process of inputting the 2-nd feature map into the main region proposal network 152, to thereby allow the main region proposal network 152 to generate one or more 2-nd ROIs corresponding to the objects for training located on the 2-nd feature map.

And, the learning device 200 may perform (iv) a process of instructing the main pooling layer 153 to generate one or more 2-nd pooled feature maps by applying at least one pooling operation to one or more regions, corresponding to the 2-nd ROIs, on the 2-nd feature map, and (v) a process of inputting the 2-nd pooled feature maps into the main confidence network 160, to thereby allow the main confidence network 160 to generate one or more 2-nd confidences corresponding to the 2-nd pooled feature maps through the deep learning.

Thereafter, the learning device 200 may perform (vi) a process of instructing a 2-nd loss layer 161 to calculate one or more 2-nd losses by referring to the 2-nd confidences and the 1-st confidences, and (vii) a process of updating at least one parameter of the main confidence network 160 via backpropagation using the 2-nd losses such that the 2-nd losses are minimized, for each of the (2_1)-st driving image for training to the (2_n)-th driving image for training, and as a result, may learn the main confidence network 160.

That is, the learning device 200 may acquire each of the 1-st confidences corresponding to each of the 1-st pooled feature maps created during the process of learning the main object detector 150, and may learn the main confidence network 160 to output at least part of the 1-st confidences corresponding to the 1-st pooled feature maps by using the 1-st pooled feature maps and their corresponding 2-nd confidences.

Meanwhile, the description above takes an example of the vehicles in the cooperative driving, however, the recognition performance of the object detector may be improved in surveillance systems and military systems using multiple cameras monitoring a same location in accordance with the present disclosure, and accordingly, a stability of an object detection system may be improved.

As described above, the present disclosure provides the optimal recognition results by integrating recognition results and confidences of the video images of the multiple cameras via V2V information fusion, to thereby improve a stability of the surveillance systems and the military systems using the object detection.

The present disclosure has an effect of improving the recognition performance of the object detector by integrating the recognition results from the multiple cameras.

The present disclosure has another effect of detecting the objects accurately without regard to surroundings by integrating the recognition results from the multiple cameras.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for integrating driving images acquired from one or more vehicles performing a cooperative driving, comprising steps of:
    (a) a main driving image integrating device, installed on at least one main vehicle among said one or more vehicles, performing (i) a process of inputting at least one main driving image, acquired from at least one main camera installed on the main vehicle, into a main object detector, to thereby allow the main object detector to (i-1) generate at least one main feature map by applying at least one convolution operation to the main driving image via a main convolutional layer, (i-2) generate one or more main ROIs (Regions Of Interest), corresponding to one or more regions where one or more main objects are estimated as located, on the main feature map, via a main region proposal network, (i-3) generate one or more main pooled feature maps by applying at least one pooling operation to one or more regions, corresponding to the main ROIs, on the main feature map, via a main pooling layer, and (i-4) generate multiple pieces of main object detection information on the main objects located on the main driving image by applying at least one fully-connected operation to the main pooled feature maps via a main fully connected layer;
    (b) the main driving image integrating device performing a process of inputting the main pooled feature maps into a main confidence network, to thereby allow the main confidence network to generate each of one or more main confidences of each of the main ROIs corresponding to each of the main pooled feature maps; and
    (c) the main driving image integrating device performing a process of acquiring multiple pieces of sub-object detection information and one or more sub-confidences from each of one or more sub-vehicles in the cooperative driving, and a process of integrating the multiple pieces of the main object detection information and the multiple pieces of the sub-object detection information by using the main confidences and the sub-confidences as weights, to thereby generate at least one object detection result of the main driving image, wherein the multiple pieces of the sub-object detection information and the sub confidences are generated by each of one or more sub-driving image integrating devices, installed on each of the sub-vehicles, wherein each of the sub-driving image integrating devices performs (i) a process of inputting each of sub-driving images into corresponding each of sub-object detectors, to thereby allow said each of the sub-object detectors to (i-1) generate each of sub-feature maps by applying at least one convolution operation to each of the sub-driving images via corresponding each of sub-convolutional layers, (i-2) generate one or more sub-ROIs, corresponding to one or more regions where one or more sub-objects are estimated as located, on each of the sub-feature maps, via corresponding each of sub-region proposal networks, (i-3) generate each of one or more sub pooled feature maps by applying at least one pooling operation to one or more regions, corresponding to each of the sub-ROIs, on each of the sub-feature maps, via corresponding each of sub-pooling layers, (i-4) generate the multiple pieces of the sub-object detection information on the sub-objects located on each of the sub-driving images by applying at least one fully connected operation to each of the sub-pooled feature maps via corresponding each of sub fully connected layers, and (i-5) input each of the sub-pooled feature maps into corresponding each of sub-confidence networks, to thereby allow each of the sub-confidence networks to generate the sub-confidences of the sub-ROIs corresponding to each of the sub pooled feature maps, wherein the main object detector and the main confidence network have been learned by a learning device, wherein the learning device has learned the main object detector by performing, if training data including one or more driving images for training are acquired, (i) a process of sampling (i-1) 1-st training data including a $(1\_1)$-st driving image for training to a $(1\_m)$-th driving image for training wherein m is an integer larger than 0 and (i-2) 2-nd training data including a $(2\_1)$-st driving image for training to a $(2\_n)$-th driving image for training wherein n is an integer larger than 0, from the training data, (ii) a process of inputting a $(1\_j)$-th driving image for training, among the $(1\_1)$-st driving image for training to the $(1\_m)$-th driving image for training, into the main convolutional layer, to thereby allow the main convolutional layer to generate at least one 1-st feature map by applying at least one convolution operation to the $(1\_j)$ th driving image for training, (iii) a process of inputting the 1-st feature map into the main region proposal network, to thereby allow the main region proposal network to generate one or more 1-st ROIs, corresponding to one or more objects for training, on the 1-st feature map, (iv) a process of instructing the main pooling layer to generate one or more 1-st pooled feature maps by applying at least one pooling operation to one or more regions, corresponding to the 1-st ROIs, on the 1-st feature map, (v) a process of instructing the main fully connected layer to generate multiple pieces of 1-st object detection information corresponding to the objects for training located on the $(1\_j)$-th driving image for training by applying at least one fully-connected operation to the 1-st pooled feature maps or at least one 1-st feature vector corresponding to the 1-st pooled feature maps, (vi) a process of instructing a 1-st loss layer to calculate one or more 1 st losses by referring to the multiple pieces of the 1-st object detection information and at least one object ground truth of the (1_j)-th driving image for training, and (vii) a process of updating at least one parameter of the main fully connected layer and the main convolutional layer via backpropagation using the 1-st losses such that the 1-st losses are minimized, for each of the (1_1)-st driving image for training to the (1_m)-th driving image for training, and wherein the learning device has learned the main confidence network by performing (i) a process of acquiring each of one or more 1-st confidences of each of the 1-st ROIs by referring to the object ground truth and the multiple pieces of the 1-st object detection information corresponding to each of the (1_1)-st driving image for training to the (1_m)-th driving image for training, (ii) a process of inputting a (2_k)-th driving image for training, among the (2_1)-st driving image for training to the (2_n)-th driving image for training, into the main convolutional layer, to thereby allow the main convolutional layer to generate at least one 2-nd feature map by applying at least one convolution operation to the (2_k)-th driving image for training, (iii) a process of inputting the 2-nd feature map into the main region proposal network, to thereby allow the main region proposal network to generate one or more 2-nd ROIs corresponding to the objects for training located on the 2-nd feature map, (iv) a process of instructing the main pooling layer to generate one or more 2-nd pooled feature maps by applying at least one pooling operation to one or more regions, corresponding to the 2-nd ROIs, on the 2-nd feature map, (v) a process of inputting the 2-nd pooled feature maps into the main confidence network, to thereby allow the main confidence network to generate one or more 2-nd confidences corresponding to the 2-nd pooled feature maps through deep learning, (vi) a process of instructing a 2-nd loss layer to calculate one or more 2-nd losses by referring to the 2-nd confidences and the 1-st confidences, and (vii) a process of updating at least one parameter of the main confidence network via backpropagation using the 2-nd losses such that the 2-nd losses are minimized, for each of the (2_1)-st driving image for training to the (2_n)-th driving image for training.

2. The method of claim 1, wherein the learning device acquires the 1-st confidences of each of the 1-st ROIs by referring to the multiple pieces of the 1-st object detection information and their object ground truths, wherein each of the 1-st confidences is 0 if each of the objects for training is absent in each of the 1-st ROIs, and each of the 1-st confidences is 1-box_error×class_error if said each of the objects for training is present in said each of the 1-st ROIs, and wherein each box_error is each error of bounding boxes included in the multiple pieces of the 1-st object detection information, and each class_error is each error of class information included in the multiple pieces of the 1-st object detection information.

3. The method of claim 2, wherein (i) said each box_error is each ratio of (i_1) each size of each of the objects for training to (i-2) a summation of errors of each of center points of the bounding boxes, and (ii) said each class_error is each summation of class errors of each estimation value on each class, to be used for classifying each of the objects for training, included in the multiple pieces of the 1-st object detection information.

4. A method for integrating driving images acquired from one or more vehicles performing a cooperative driving, comprising steps of:

(a) a main driving image integrating device, installed on at least one main vehicle among said one or more vehicles, performing (i) a process of inputting at least one main driving image, acquired from at least one main camera installed on the main vehicle, into a main object detector, to thereby allow the main object detector to (i-1) generate at least one main feature map by applying at least one convolution operation to the main driving image via a main convolutional layer, (i-2) generate one or more main ROIs (Regions Of Interest), corresponding to one or more regions where one or more main objects are estimated as located, on the main feature map, via a main region proposal network, (i-3) generate one or more main pooled feature maps by applying at least one pooling operation to one or more regions, corresponding to the main ROIs, on the main feature map, via a main pooling layer, and (i-4) generate multiple pieces of main object detection information on the main objects located on the main driving image by applying at least one fully-connected operation to the main pooled feature maps via a main fully connected layer;

(b) the main driving image integrating device performing a process of inputting the main pooled feature maps into a main confidence network, to thereby allow the main confidence network to generate each of one or more main confidences of each of the main ROIs corresponding to each of the main pooled feature maps; and (c) the main driving image integrating device performing a process of acquiring multiple pieces of sub-object detection information and one or more sub-confidences from each of one or more sub-vehicles in the cooperative driving, and a process of integrating the multiple pieces of the main object detection information and the multiple pieces of the sub-object detection information by using the main confidences and the sub-confidences as weights, to thereby generate at least one object detection result of the main driving image, wherein the multiple pieces of the sub-object detection information and the sub confidences are generated by each of one or more sub-driving image integrating devices, installed on each of the sub-vehicles, wherein each of the sub-driving image integrating devices performs (i) a process of inputting each of sub-driving images into corresponding each of sub-object detectors, to thereby allow said each of the sub-object detectors to (i-1) generate each of sub-feature maps by applying at least one convolution operation to each of the sub-driving images via corresponding each of sub-convolutional layers, (i-2) generate one or more sub-ROIs, corresponding to one or more regions where one or more sub-objects are estimated as located, on each of the sub-feature maps, via corresponding each of sub-region proposal networks, (i-3) generate each of one or more sub pooled feature maps by applying at least one pooling operation to one or more regions, corresponding to each of the sub-ROIs, on each of the sub-feature maps, via corresponding each of sub-pooling layers, (i-4) generate the multiple pieces of the sub-object detection information on the sub-objects located on each of the sub-driving images by applying at least one fully connected operation to each of the sub-pooled feature maps via corresponding each of sub fully connected layers, and (i-5) input each of the sub-pooled feature maps into corresponding each of sub-confidence networks, to thereby allow each of the sub-confidence networks to generate the sub-confidences of the sub-ROIs corresponding to each of the sub pooled feature maps, wherein, in order to integrate the multiple pieces of the main object detection information and the multiple pieces of the sub-object detection information by using the main confidences and the sub-confidences as weights, the main driving image integrating device performs (i) a process of weighted summation of each estimation value on each class included in each piece of the specific object detection information by using each of specific confidences, corresponding to each piece of the specific object detection information, among the main confidences and the sub-confidences, as each weight, and a process of acquiring a specific class having a highest value, among weight-summed classes, as optimal class information corresponding to the specific object, and (ii) a process of weighted summation of each piece of specific regression information included in each piece of the specific object detection information by using each of the specific confidences corresponding to each piece of the specific object detection information as weights, and a process of acquiring weight-summed regression information as optimal regression information corresponding to the specific object.

5. The method of claim 4, wherein, in order to integrate the multiple pieces of the main object detection information and the multiple pieces of the sub-object detection information by using the main confidences and the sub-confidences as weights, if 1-st overlapping object detection information among the 1-st object detection information and 2-nd overlapping object detection information among the 2-nd object detection information are determined as present which overlap each other, the main driving image integrating device performs (i) a process of determining that the 1-st overlapping object detection information and the 2-nd overlapping object detection information correspond to the specific object if an intersection over union of a 1-st bounding box corresponding to the 1-st overlapping object detection information and a 2-nd bounding box corresponding to the 2-nd overlapping object detection information is equal to or greater than a preset threshold, and (ii) a process of determining that the 1-st overlapping object detection information and the 2-nd overlapping object detection information correspond to different objects if the intersection over union is less than the preset threshold.

6. A main driving image integrating device, installed on at least one main vehicle among one or more vehicles in a cooperative driving, for integrating driving images acquired from the vehicles, comprising:
at least one memory that stores instructions; and
at least one processor configured to execute the instructions to perform or support another device to perform: (I) a process of inputting at least one main driving image, acquired from at least one main camera installed on the main vehicle, into a main object detector, to thereby allow the main object detector to (I-1) generate at least one main feature map by applying at least one convolution operation to the main driving image via a main convolutional layer, (I-2) generate one or more main ROIs (Regions Of Interest), corresponding to one or more regions where one or more main objects are estimated as located, on the main feature map, via a main region proposal network, (I-3) generate one or more main pooled feature maps by applying at least one pooling operation to one or more regions, corresponding to the main ROIs, on the main feature map, via a main pooling layer, and (I-4) generate multiple pieces of main object detection information on the main objects located on the main driving image by applying at least one fully-connected operation to the main pooled feature maps via a main fully connected layer, (II) a process of inputting the main pooled feature maps into a main confidence network, to thereby allow the main confidence network to generate each of one or more main confidences of each of the main ROIs corresponding to each of the main pooled feature maps, and (III) a process of acquiring multiple pieces of sub-object detection information and one or more sub confidences from each of one or more sub-vehicles in the cooperative driving, and a process of integrating the multiple pieces of the main object detection information and the multiple pieces of the sub-object detection information by using the main confidences and the sub confidences as weights, to thereby generate at least one object detection result of the main driving image,
wherein the multiple pieces of the sub-object detection information and the sub confidences are generated by each of one or more sub-driving image integrating devices, installed on each of the sub-vehicles, and wherein each of the sub-driving image integrating devices performs (i) a process of inputting each of sub-driving images into corresponding each of sub-object detectors, to thereby allow said each of the sub-object detectors to (i-1) generate each of sub-feature maps by applying at least one convolution operation to each of the sub-driving images via corresponding each of sub-convolutional layers, (i-2) generate one or more sub-ROIs, corresponding to one or more regions where one or more sub-objects are estimated as located, on each of the sub-feature maps, via corresponding each of sub-region proposal networks, (i-3) generate each of one or more sub-pooled feature maps by applying at least one pooling operation to one or more regions, corresponding to each of the sub-ROIs, on each of the sub-feature maps, via corresponding each of sub-pooling layers, (i-4) generate the multiple pieces of the sub-object detection information on the sub-objects located on each of the sub-driving images by applying at least one fully-connected operation to each of the sub-pooled feature maps via corresponding each of sub-fully connected layers, and (i-5) input each of the sub-pooled feature maps into corresponding each of sub-confidence networks, to thereby allow each of the sub-confidence networks to generate the sub-confidences of the sub-ROIs corresponding to each of the sub pooled feature maps,
wherein the main object detector and the main confidence network have been learned by a learning device,
wherein the learning device has learned the main object detector by performing, if training data including one or more driving images for training are acquired, (i) a process of sampling (i-1) 1-st training data including a (1_1)-st driving image for training to a (1_m)-th driving image for training wherein m is an integer larger than 0 and (i-2) 2-nd training data including a (2_1)-st driving image for training to a (2_n)-th driving image for training, from the training data wherein n is an integer larger than 0, (ii) a process of inputting a (1_j)-th driving image for training, among the (1_1)-st driving image for training to the (1_m)-th driving image for training, into the main convolutional layer, to thereby allow the main convolutional layer to generate at least one 1-st feature map by applying at least one convolution operation to the (1_j) th driving image for training, (iii) a process of inputting the 1-st feature map into the main region proposal network, to thereby allow the main region proposal network to generate one or more 1-st ROIs, corresponding to one or more objects for training, on the 1-st feature map, (iv) a process of instructing the main pooling layer to generate one or more 1-st pooled feature maps by applying at least one pooling operation to one or more regions, corresponding to the 1-st ROIs, on the 1-st feature map, (v) a process of instructing the main fully connected layer to generate multiple pieces of 1-st object detection information corresponding to the objects for training located on the (1_j)-th driving image for training by applying at least one fully-connected operation to the 1-st pooled feature maps or at least one 1-st feature vector corresponding to the 1-st pooled feature maps, (vi) a process of instructing a 1-st loss layer to calculate one or more 1 st losses by referring to the multiple pieces of the 1-st object detection information and at least one object ground truth of the (1_j)-th driving image for training, and (vii) a process of updating at least one parameter of the main fully connected layer and the main convolutional layer via backpropagation using the 1-st losses such that the 1-st losses are minimized, for each of the (1_1)-st driving image for training to the (1_m)-th driving image for training, and wherein the learning device has learned the main confidence network by performing (i) a process of acquiring each of one or more 1-st confidences of each of the 1-st ROIs by referring to the object ground truth and the multiple pieces of the 1-st object detection information corresponding to each of the (1_1)-st driving image for training to the (1_m)-th driving image for training, (ii) a process of inputting a (2_k)-th driving image for training, among the (2_1)-st driving image for training to the (2_n)-th driving image for training, into the main convolutional layer, to thereby allow the main convolutional layer to generate at least one 2-nd feature map by applying at least one convolution operation to the (2_k)-th driving image for training, (iii) a process of inputting the 2-nd feature map into the main region proposal network, to thereby allow the main region proposal network to generate one or more 2-nd ROIs corresponding to the objects for training located on the 2-nd feature map, (iv) a process of instructing the main pooling layer to generate one or more 2-nd pooled feature maps by applying at least one pooling operation to one or more regions, corresponding to the 2-nd ROIs, on the 2-nd feature map, (v) a process of inputting the 2-nd pooled feature maps into the main confidence network, to thereby allow the main confidence network to generate one or more 2-nd confidences corresponding to the 2-nd pooled feature maps through deep learning, (vi) a process of instructing a 2-nd loss layer to calculate one or more 2-nd losses by referring to the 2-nd confidences and the 1-st confidences, and (vii) a process of updating at least one parameter of the main confidence network via backpropagation using the 2-nd losses such that the 2-nd losses are minimized, for each of the (2_1)-st driving image for training to the (2_n)-th driving image for training.

7. The main driving image integrating device of claim 6, wherein the learning device acquires the 1-st confidences of each of the 1-st ROIs by referring to the multiple pieces of the 1-st object detection information and their object ground truths, wherein each of the 1-st confidences is 0 if each of the objects for training is absent in each of the 1-st ROIs, and each of the 1-st confidences is 1-box_error×class_error if said each of the objects for training is present in said each of the 1-st ROIs, and wherein each box_error is each error of bounding boxes included in the multiple pieces of the 1-st object detection information, and each class_error is each error of class information included in the multiple pieces of the 1-st object detection information.

8. The main driving image integrating device of claim 7, wherein (i) said each box_error is each ratio of (i-1) each size of each of the objects for training to (i-2) a summation of errors of each of center points of the bounding boxes, and (ii) said each class_error is each summation of class errors of each estimation value on each class, to be used for classifying each of the objects for training, included in the multiple pieces of the 1-st object detection information.

9. A main driving image integrating device, installed on at least one main vehicle among one or more vehicles in a cooperative driving, for integrating driving images acquired from the vehicles, comprising:

at least one memory that stores instructions; and at least one processor configured to execute the instructions to perform or support another device to perform: (I) a process of inputting at least one main driving image, acquired from at least one main camera installed on the main vehicle, into a main object detector, to thereby allow the main object detector to (I-1) generate at least one main feature map by applying at least one convolution operation to the main driving image via a main convolutional layer, (I-2) generate one or more main ROIs (Regions Of Interest), corresponding to one or more regions where one or more main objects are estimated as located, on the main feature map, via a main region proposal network, (I-3) generate one or more main pooled feature maps by applying at least one pooling operation to one or more regions, corresponding to the main ROIs, on the main feature map, via a main pooling layer, and (I-4) generate multiple pieces of main object detection information on the main objects located on the main driving image by applying at least one fully-connected operation to the main pooled feature maps via a main fully connected layer, (II) a process of inputting the main pooled feature maps into a main confidence network, to thereby allow the main confidence network to generate each of one or more main confidences of each of the main ROIs corresponding to each of the main pooled feature maps, and (III) a process of acquiring multiple pieces of sub-object detection information and one or more sub confidences from each of one or more sub-vehicles in the cooperative driving, and a process of integrating the multiple pieces of the main object detection information and the multiple pieces of the sub-object detection information by using the main confidences and the sub confidences as weights, to thereby generate at least one object detection result of the main driving image, wherein the multiple pieces of the sub-object detection information and the sub confidences are generated by each of one or more sub-driving image integrating devices, installed on each of the sub-vehicles, and wherein each of the sub-driving image integrating devices performs (i) a process of inputting each of sub-driving images into corresponding each of sub-object detectors, to thereby allow said each of the sub-object detectors to (i-1) generate each of sub-feature maps by applying at least one convolution operation to each of the sub-driving images via corresponding each of sub-convolutional layers, (i-2) generate one or more sub-ROIs, corresponding to one or more regions where one or more sub-objects are estimated as located, on each of the sub-feature maps, via corresponding each of sub-region proposal networks, (i-3) generate each of one or more sub-pooled feature maps by applying at least one pooling operation to one or more regions, corresponding to each of the sub-ROIs, on each of the sub-feature maps, via corresponding each of sub-pooling layers, (i-4) generate the multiple pieces of the sub-object detection information on the sub-objects located on each of the sub-driving images by applying at least one fully-connected operation to each of the sub-pooled feature maps via corresponding each of sub-fully connected layers, and (i-5) input each of the sub-pooled feature maps into corresponding each of sub-confidence networks, to thereby allow each of the sub-confidence networks to generate the sub-confidences of the sub-ROIs corresponding to each of the sub pooled feature maps, wherein, in order to integrate the multiple pieces of the main object detection information and the multiple pieces of the sub-object detection information by using the main confidences and the sub-confidences as weights, the processor performs (i) a process of weighted summation of each estimation value on each class included in each piece of the specific object detection information by using each of specific confidences, corresponding to each piece of the specific object detection information, among the main confidences and the sub-confidences, as each weight, and a process of acquiring a specific class having a highest value, among weight-summed classes, as optimal class information corresponding to the specific object, and (ii) a process of weighted summation of each piece of specific regression information included in each piece of the specific object detection information by using each of the specific confidences corresponding to each piece of the specific object detection information as weights, and a process of acquiring weight-summed regression information as optimal regression information corresponding to the specific object.

10. The main driving image integrating device of claim 9, wherein, in order to integrate the multiple pieces of the main object detection information and the multiple pieces of the sub-object detection information by using the main confidences and the sub confidences as weights, if 1-st overlapping object detection information among the 1-st object detection information and 2-nd overlapping object detection information among the 2-nd object detection information are determined as present which overlap each other, the processor performs (i) a process of determining that the 1-st overlapping object detection information and the 2-nd overlapping object detection information correspond to the specific object if an intersection over union of a 1-st bounding box corresponding to the 1-st overlapping object detection information and a 2-nd bounding box corresponding to the 2-nd overlapping object detection information is equal to or greater than a preset threshold, and (ii) a process of determining that the 1-st overlapping object detection information and the 2-nd overlapping object detection information correspond to different objects if the intersection over union is less than the preset threshold.

* * * * *